(12) United States Patent
Ramachandran et al.

(10) Patent No.: US 7,159,412 B2
(45) Date of Patent: Jan. 9, 2007

(54) COMPRESSOR HEAD, INTERNAL DISCRIMINATOR, EXTERNAL DISCRIMINATOR, MANIFOLD DESIGN FOR REFRIGERATION RECOVERY APPARATUS

(75) Inventors: Ajit Ramachandran, Fort Wayne, IN (US); Keith Sliger, Corunna, IN (US); Ronald A. Plasek, Lakeville, MN (US)

(73) Assignee: Ritchie Engineering Company, Inc., Bloomington, MN (US)

( * ) Notice: Subject to any disclaimer, the term of this patent is extended or adjusted under 35 U.S.C. 154(b) by 209 days.

(21) Appl. No.: 11/013,015

(22) Filed: Dec. 15, 2004

(65) Prior Publication Data

US 2005/0092010 A1 May 5, 2005

Related U.S. Application Data

(63) Continuation of application No. 10/394,942, filed on Mar. 21, 2003, now Pat. No. 6,832,491.

(60) Provisional application No. 60/366,208, filed on Mar. 21, 2002, provisional application No. 60/377,406, filed on May 1, 2002.

(51) Int. Cl.
*F25B 45/00* (2006.01)
(52) U.S. Cl. .......................... 62/292; 62/149
(58) Field of Classification Search .................... 62/77, 62/85, 149, 292
See application file for complete search history.

(56) References Cited

U.S. PATENT DOCUMENTS

| 483,778 A | 10/1892 | Chesterton |
|---|---|---|
| 1,170,588 A | 2/1916 | Wells |
| 1,691,530 A | 11/1928 | Slayton |
| 1,716,482 A | 6/1929 | Bradbury |
| 1,929,399 A | 9/1933 | Nielsen ...................... 221/47.3 |
| 1,983,865 A | 12/1934 | McCullough ................. 255/27 |
| 1,984,865 A | 12/1934 | Creveling .................... 285/170 |
| 2,240,870 A | 5/1941 | Starr ............................ 284/19 |
| 2,328,363 A | 8/1943 | Sundholm ................... 221/47.5 |
| 2,683,930 A | 7/1954 | Walters ......................... 30/91 |
| 2,821,781 A | 2/1958 | Zeiler .......................... 30/102 |
| 2,869,413 A | 1/1959 | Anderson ...................... 86/24 |
| 2,875,517 A | 3/1959 | Bauman ....................... 30/101 |
| 3,107,298 A | 10/1963 | Alburger ...................... 250/71 |
| 3,135,050 A | 6/1964 | Franck ......................... 30/102 |
| 3,232,070 A | 2/1966 | Sparano ....................... 62/149 |
| 3,315,355 A | 4/1967 | Osburn et al. ................ 30/102 |
| 3,624,682 A | 11/1971 | Kowal .......................... 30/102 |
| 3,799,406 A | 3/1974 | St. John et al. ............. 222/309 |
| 3,837,764 A | 9/1974 | Fritch et al. .................. 417/62 |
| 3,916,205 A | 10/1975 | Kleinerman ................ 250/461 |
| 3,961,868 A | 6/1976 | Droege, Sr. et al. ........ 417/550 |

(Continued)

OTHER PUBLICATIONS

U.S. Appl. No. 60/377,406, filed May 1, 2002, Ramachandran et al.

(Continued)

*Primary Examiner*—Melvin Jones
(74) *Attorney, Agent, or Firm*—Vidas, Arrett & Steinkraus, P.A.

(57) ABSTRACT

The compressor head, internal and/or external discriminator, and manifold design in general utilize ball valves on the suction and discharge of a cylinder head in the recovery of refrigerant liquid and/or vapor. The device facilitates the flashing of liquid refrigerant pumped to the compressor which, in turn, assists to cool the compressor head. The flashing of liquid refrigerant to vapor also deters liquid transfer into the compressor enhancing performance thereof. The vapor passages within the discriminator, cylinder head and/or manifold are sized for receipt of spring actuated ball's to open and/or close the vapor passages during suction and/or discharge of refrigerant vapor or liquid by the compressor.

7 Claims, 6 Drawing Sheets

U.S. PATENT DOCUMENTS

| | | | | |
|---|---|---|---|---|
| 3,961,869 | A | 6/1976 | Droege, Sr. et al. | 417/555 |
| 3,982,864 | A | 9/1976 | Cain | 418/149 |
| 4,103,291 | A | 7/1978 | Howe et al. | 340/522 |
| 4,112,335 | A | 9/1978 | Gonser | 315/241 |
| 4,191,145 | A | 3/1980 | Fowler | 123/117 |
| 4,197,884 | A | 4/1980 | Maran | 141/383 |
| 4,207,031 | A | 6/1980 | Maskrey et al. | 417/12 |
| 4,227,431 | A | 10/1980 | Wells | 82/76 |
| 4,261,178 | A | 4/1981 | Cain | 62/149 |
| 4,275,999 | A | 6/1981 | Hetzel et al. | 417/299 |
| 4,294,011 | A | 10/1981 | Kemme | 30/106 |
| 4,295,794 | A | 10/1981 | Cain | 417/62 |
| 4,298,005 | A | 11/1981 | Mutzhas | 128/396 |
| 4,298,806 | A | 11/1981 | Herold | 250/504 |
| 4,328,678 | A | 5/1982 | Kono et al. | 62/126 |
| 4,363,222 | A | 12/1982 | Cain | 62/292 |
| 4,364,236 | A | 12/1982 | Lower et al. | 62/77 |
| 4,441,330 | A | 4/1984 | Lower et al. | 62/149 |
| 4,508,490 | A | 4/1985 | Ramirez et al. | 417/234 |
| 4,523,897 | A | 6/1985 | Lower et al. | 417/244 |
| 4,531,288 | A | 7/1985 | Aubriot | 30/99 |
| 4,540,353 | A | 9/1985 | Murray | 418/13 |
| 4,544,332 | A | 10/1985 | Shibuya | 417/269 |
| 4,545,405 | A | 10/1985 | LaBelle | 137/524 |
| 4,608,755 | A | 9/1986 | Braasch | 30/97 |
| 4,631,006 | A | 12/1986 | Murray | 417/234 |
| 4,653,741 | A | 3/1987 | Palmer | 271/90 |
| 4,681,524 | A | 7/1987 | Ikeda et al. | 425/376 |
| 4,687,021 | A | 8/1987 | Ise et al. | 137/526 |
| 4,693,674 | A | 9/1987 | Fukai et al. | 417/269 |
| 4,706,970 | A | 11/1987 | Ramirez | 277/205 |
| 4,716,296 | A | 12/1987 | Bussiere et al. | 250/504 |
| 4,730,550 | A | 3/1988 | Bramstedt et al. | 92/240 |
| 4,766,733 | A | 8/1988 | Scuderi | 62/77 |
| 4,784,583 | A | 11/1988 | Bar | 417/312 |
| 4,831,918 | A | 5/1989 | Mielke et al. | 92/222 |
| 4,842,498 | A | 6/1989 | Bramstedt et al. | 417/571 |
| 4,848,213 | A | 7/1989 | Wood et al. | 92/172 |
| 4,859,162 | A | 8/1989 | Cox | 418/152 |
| 4,878,356 | A | 11/1989 | Punches et al. | 62/149 |
| 4,890,385 | A | 1/1990 | VanderPol et al. | 30/101 |
| 4,938,063 | A | 7/1990 | Leighley | 73/40.7 |
| 4,938,818 | A | 7/1990 | Dzedzej et al. | 156/69 |
| 4,941,520 | A | 7/1990 | Dowzall et al. | 141/114 |
| 4,948,016 | A | 8/1990 | Summons et al. | 222/158 |
| 4,967,089 | A | 10/1990 | Reilly et al. | 250/493.1 |
| 4,981,020 | A * | 1/1991 | Scuderi | 62/77 |
| 4,990,789 | A | 2/1991 | Uesaki | 250/504 R |
| 4,995,795 | A | 2/1991 | Hetzel et al. | 417/571 |
| 4,998,764 | A | 3/1991 | O'Connell et al. | 294/149 |
| 5,006,047 | A | 4/1991 | O'Connell | 417/238 |
| 5,020,331 | A | 6/1991 | Michny | 62/77 |
| 5,022,155 | A | 6/1991 | Hockett | 30/93 |
| 5,022,312 | A | 6/1991 | Rozek et al. | 92/240 |
| 5,027,605 | A | 7/1991 | Hardesty | 62/77 |
| 5,031,314 | A | 7/1991 | Berrong et al. | 29/889 |
| 5,033,941 | A | 7/1991 | Jensen | 417/415 |
| 5,046,320 | A | 9/1991 | Loose et al. | 62/77 |
| 5,050,055 | A | 9/1991 | Lindsay et al. | 362/293 |
| 5,064,234 | A | 11/1991 | Marozsan et al. | 294/64.1 |
| 5,070,917 | A | 12/1991 | Ferris et al. | 141/38 |
| 5,090,211 | A | 2/1992 | Peters | 62/149 |
| 5,092,224 | A | 3/1992 | Rozek | 92/209 |
| 5,099,577 | A | 3/1992 | Hutt | 30/101 |
| 5,101,637 | A | 4/1992 | Daily | 62/50.2 |
| 5,113,747 | A | 5/1992 | Pignerol | 92/175 |
| 5,121,022 | A | 6/1992 | Sargeant et al. | 310/217 |
| 5,167,140 | A | 12/1992 | Cooper et al. | 73/40.7 |
| 5,170,632 | A | 12/1992 | Reilly, Jr. et al. | 62/77 |
| 5,175,437 | A | 12/1992 | Waluszko | 250/504 R |
| 5,185,552 | A | 2/1993 | Suzuki et al. | 313/231 |
| 5,208,462 | A | 5/1993 | O'Connor et al. | 250/493.1 |
| 5,209,795 | A | 5/1993 | DeRosa et al. | 156/69 |
| 5,213,025 | A | 5/1993 | Rozek | 92/109 |
| 5,213,125 | A | 5/1993 | Leu | 137/15 |
| 5,218,831 | A | 6/1993 | Keltner | 62/77 |
| 5,226,300 | A | 7/1993 | Christensen et al. | 62/77 |
| 5,240,483 | A | 8/1993 | Rosen | 55/270 |
| 5,247,802 | A | 9/1993 | Maniez et al. | 62/77 |
| 5,266,798 | A | 11/1993 | Borden et al. | 250/239 |
| 5,275,155 | A | 1/1994 | Changaris | 607/94 |
| D344,527 | S | 2/1994 | Drago | D15/79 |
| 5,282,366 | A | 2/1994 | Reilly, Jr. et al. | 62/292 |
| 5,295,359 | A | 3/1994 | Reilly, Jr. et al. | 62/125 |
| 5,309,729 | A | 5/1994 | Sagar | 62/195 |
| 5,327,932 | A | 7/1994 | Rozek | 137/512.15 |
| 5,362,971 | A | 11/1994 | McMahon et al. | 250/577 |
| 5,367,885 | A | 11/1994 | Sagar | 62/135 |
| 5,373,211 | A | 12/1994 | Ramirez-Coronel et al. | 310/260 |
| 5,400,606 | A * | 3/1995 | Scuderi | 62/77 |
| 5,423,702 | A | 6/1995 | Butler | 440/88 |
| 5,440,919 | A | 8/1995 | Cooper | 73/40.7 |
| 5,449,251 | A | 9/1995 | Daily et al. | 405/128 |
| 5,450,727 | A | 9/1995 | Ramirez et al. | 62/37 |
| 5,456,287 | A | 10/1995 | Leu | 137/885 |
| 5,493,953 | A | 2/1996 | Bolthouse et al. | 92/165 |
| D368,723 | S | 4/1996 | Blindauer et al. | D15/9.1 |
| 5,515,769 | A | 5/1996 | Basinski et al. | 92/80 |
| 5,517,846 | A | 5/1996 | Caggiani | 73/4 R |
| D370,916 | S | 6/1996 | Rozek et al. | D15/9.2 |
| 5,523,573 | A | 6/1996 | Hanninen et al. | 250/459.1 |
| 5,538,051 | A | 7/1996 | Brown et al. | 141/18 |
| 5,540,254 | A | 7/1996 | McGowan et al. | 137/315 |
| 5,542,824 | A | 8/1996 | Lee | 417/312 |
| 5,543,137 | A | 8/1996 | Repper et al. | 424/59 |
| 5,548,965 | A | 8/1996 | Chen et al. | 137/251.1 |
| 5,556,260 | A | 9/1996 | Takenaka et al. | 417/269 |
| 5,557,972 | A | 9/1996 | Jacobs et al. | 73/756 |
| 5,567,126 | A | 10/1996 | Meece et al. | 417/310 |
| RE35,370 | E | 11/1996 | Henry | 73/40.7 |
| 5,571,004 | A | 11/1996 | Masters et al. | 418/107 |
| 5,572,869 | A | 11/1996 | Schantz et al. | 60/528 |
| 5,577,898 | A | 11/1996 | Lee | 417/312 |
| RE35,395 | E | 12/1996 | Henry | 73/40.7 |
| 5,584,676 | A | 12/1996 | Dreiman | 417/569 |
| D377,179 | S | 1/1997 | Sundheim et al. | D15/79 |
| 5,592,245 | A | 1/1997 | Moore et al. | 351/163 |
| 5,592,826 | A | 1/1997 | Sagar et al. | 62/195 |
| 5,593,224 | A | 1/1997 | Kunkel et al. | 362/287 |
| 5,593,291 | A | 1/1997 | Lynn | 417/539 |
| D377,938 | S | 2/1997 | Rozek | D15/9.1 |
| D377,967 | S | 2/1997 | Rozek et al. | D23/235 |
| 5,601,423 | A | 2/1997 | Meece et al. | 418/131 |
| 5,606,862 | A | 3/1997 | Peckjian et al. | 62/77 |
| 5,613,842 | A | 3/1997 | Alfano et al. | 417/312 |
| 5,628,349 | A | 5/1997 | Diggins et al. | 141/3 |
| D379,996 | S | 6/1997 | Leu et al. | D15/9 |
| 5,644,969 | A | 7/1997 | Leu et al. | 92/60.5 |
| 5,650,563 | A | 7/1997 | Cooper et al. | 73/40.7 |
| D382,883 | S | 8/1997 | Breitzman et al. | D15/9 |
| D382,885 | S | 8/1997 | Deiner et al. | D15/79 |
| 5,671,605 | A | 9/1997 | Helterbrand | 62/85 |
| 5,674,000 | A | 10/1997 | Kalley | 362/293 |
| 5,674,054 | A | 10/1997 | Ota et al. | 417/269 |
| 5,678,415 | A | 10/1997 | Peckjian et al. | 62/149 |
| 5,681,258 | A | 10/1997 | Lowe et al. | 494/20 |
| 5,681,984 | A | 10/1997 | Cavestri | 73/40.7 |
| 5,685,161 | A | 11/1997 | Peckjian et al. | 62/149 |
| 5,694,985 | A | 12/1997 | Diggins | 141/4 |
| 5,697,766 | A | 12/1997 | Oh | 417/312 |
| 5,699,678 | A | 12/1997 | Trigiani | 62/292 |
| 5,709,091 | A | 1/1998 | Todack | 62/85 |
| 5,718,571 | A | 2/1998 | Rozek | 417/566 |

| | | | |
|---|---|---|---|
| 5,758,506 A * | 6/1998 | Hancock et al. | 62/77 |
| 5,761,924 A | 6/1998 | Peckjian | 62/292 |
| 5,788,364 A | 8/1998 | Cooper et al. | 362/293 |
| 5,804,822 A | 9/1998 | Brass et al. | 250/302 |
| D399,214 S | 10/1998 | DeRuyter | D15/9 |
| 5,816,692 A | 10/1998 | Cooper et al. | 362/293 |
| 5,817,589 A | 10/1998 | de Agudelo et al. | 502/53 |
| 5,826,636 A | 10/1998 | Trigiani | 141/382 |
| 5,852,563 A | 12/1998 | Weber et al. | 364/528.17 |
| D405,455 S | 2/1999 | Leu et al. | D15/9 |
| 5,865,210 A | 2/1999 | Fort et al. | 137/315 |
| 5,875,638 A | 3/1999 | Tinsler | 62/149 |
| 5,888,055 A | 3/1999 | Lee | 417/312 |
| 5,890,879 A | 4/1999 | Rozek | 417/363 |
| 5,905,268 A | 5/1999 | Garcia et al. | 250/504 |
| 5,906,106 A | 5/1999 | Brown et al. | 62/195 |
| 5,910,160 A | 6/1999 | Cakmakci et al. | 62/195 |
| 5,916,249 A | 6/1999 | Baker | 62/85 |
| D413,123 S | 8/1999 | Leonhard et al. | D15/7 |
| 5,931,562 A | 8/1999 | Arato | 362/184 |
| 5,934,091 A | 8/1999 | Hanson et al. | 62/149 |
| 5,938,411 A | 8/1999 | Seo | 417/312 |
| 5,970,844 A | 10/1999 | Lynn et al. | 92/12.2 |
| 5,975,714 A | 11/1999 | Vetorino et al. | 362/192 |
| 5,979,224 A | 11/1999 | Cavestri | 73/40.7 |
| 5,992,170 A | 11/1999 | Yap | 62/296 |
| 5,997,154 A | 12/1999 | Cooper et al. | 362/293 |
| D419,567 S | 1/2000 | Weiss | D15/7 |
| 6,016,661 A | 1/2000 | Sagar | 62/149 |
| 6,028,264 A | 2/2000 | Schmidt | 359/264 |
| 6,029,472 A * | 2/2000 | Galbreath, Sr. | 62/475 |
| 6,050,310 A | 4/2000 | Trigiani | 141/382 |
| 6,055,898 A | 5/2000 | Rinninger | 92/99 |
| 6,056,162 A | 5/2000 | Leighley | 222/156 |
| 6,056,521 A | 5/2000 | Leu et al. | 417/423.14 |
| 6,074,174 A | 6/2000 | Lynn et al. | 417/269 |
| 6,095,661 A | 8/2000 | Lebens et al. | 362/184 |
| 6,102,696 A | 8/2000 | Osterwalder et al. | 433/29 |
| 6,105,375 A | 8/2000 | Takano et al. | 62/149 |
| D431,007 S | 9/2000 | Trigiani et al. | D10/101 |
| 6,124,659 A | 9/2000 | Rowe et al. | 310/214 |
| 6,133,596 A | 10/2000 | Woolaway et al. | 257/251 |
| 6,134,899 A | 10/2000 | Brown et al. | 62/195 |
| 6,135,067 A | 10/2000 | Klamm et al. | 123/41.54 |
| 6,135,136 A | 10/2000 | Klamm | 137/205 |
| 6,135,144 A | 10/2000 | Rozek | 137/543.17 |
| 6,138,462 A | 10/2000 | Murray et al. | 62/149 |
| RE36,951 E | 11/2000 | Cooper et al. | 73/40.7 |
| D433,346 S | 11/2000 | Evans et al. | D10/75 |
| 6,152,193 A | 11/2000 | Klamm | 141/98 |
| D434,868 S | 12/2000 | Trigiani | D26/45 |
| 6,155,066 A | 12/2000 | Chandler et al. | 62/292 |
| 6,158,234 A | 12/2000 | Szutu | 62/292 |
| 6,159,005 A | 12/2000 | Herold et al. | 433/29 |
| 6,161,566 A | 12/2000 | Klamm | 137/317 |
| 6,164,348 A | 12/2000 | Rodwell et al. | 141/382 |
| 6,165,384 A | 12/2000 | Cooper et al. | 252/301.19 |
| 6,177,678 B1 | 1/2001 | Brass et al. | 250/461.1 |
| 6,186,197 B1 | 2/2001 | Trigiani | 141/382 |
| 6,188,130 B1 | 2/2001 | Ramirez et al. | 257/706 |
| 6,193,475 B1 | 2/2001 | Rozek | 417/360 |
| D438,875 S | 3/2001 | Rozek | D15/7 |
| D441,675 S | 5/2001 | Trigiani et al. | D10/101 |
| 6,234,215 B1 | 5/2001 | Klamm | 141/1 |
| 6,253,810 B1 | 7/2001 | Trigiani | 141/382 |
| 6,257,001 B1 | 7/2001 | Muldowney et al. | 62/55.5 |
| 6,293,319 B1 | 9/2001 | Trigiani | 141/382 |
| 6,779,350 B1 | 8/2004 | Ramachandran et al. | 62/77 |
| 6,832,491 B1 | 12/2004 | Ramachandran et al. | |
| 2002/0096643 A1 | 7/2002 | Kalley et al. | 250/458.1 |

OTHER PUBLICATIONS

U.S. Appl. No. 60/336,208, filed Mar. 21, 2002, Ramachandran et al.
U.S. Appl. No. 10/394,942, filed Mar. 21, 2003, Ramachandran et al.
Pages from the Robinair HVAC-R Edition Catalog SA 976S (Nov. 1996).
Pages from the Robinair Master Catalog SA 98-1 (Dec. 1997).
Brochure entitled "Yellow Jacket Refrigerant Recovery Systems" from Ritchie Engineering Company, Inc., Copyright 1998.

* cited by examiner

COMPRESSOR HEAD, INTERNAL DISCRIMINATOR, EXTERNAL DISCRIMINATOR, MANIFOLD DESIGN FOR REFRIGERATION RECOVERY APPARATUS

CROSS-REFERENCE TO RELATED APPLICATIONS

This application is continuation application claiming priority to U.S. application Ser. No. 10/394,942, filed Mar. 21, 2003, and which will issue Dec. 21, 2004, as U.S. Pat. No. 6,832,491 which further claims the benefit of and priority to U.S. Provisional Patent Application Ser. No. 60/366,208, filed Mar. 21, 2002, and U.S. Provisional Patent Application Ser. No. 60/377,406, filed May 1, 2002, the entire contents all of which are incorporated herein by reference in their entireties.

BACKGROUND OF THE INVENTION

Refrigerant recovery devices are used in the repair of refrigeration equipment to reclaim/recover refrigerant vapor and/or liquid.

Generally, devices utilized to recover refrigerant vapor and/or liquid include compressors having cylinders, compressor heads, pistons and valves. In the past it was common to use a triangular shaped poppet valve as a portion of the compressor head used to recover refrigerant vapor during repair of a refrigeration system. The problem with the use of poppet valves is the exposure of the valve to liquids. A poppet valve exposed to liquid will frequently be pulled into the suction chamber by a piston during the piston down stroke. When the piston proceeds to the upstroke, the piston may crush the poppet valve against the cylinder head destroying the compressor. Alternatively, compressors as known may utilize reed valves. The problem with reed valves is the failure to provide acceptable performance following exposure to liquids which will blow and destroy the reed valve causing compressor failure.

In the past, discriminators have been used to differentiate between liquid and gas refrigerants during the refrigerant recovery process. The known discriminators were generally electronic devices which attempted to separate liquid from vapor by sensing the pressure of the liquid or vapor and then redirecting the liquid or vapor through the use of solenoid valves to open or close ports of the inlet into the compressor. Electronic discriminators are frequently very costly and oversized reducing utility in practical applications. In the past, another method utilized to separate liquid from vapor occurred by employing a cycling solenoid. The compressor was generally protected in this embodiment, however, the flow of liquid and/or vapor through the compressor was not maximized.

Manifolds are normally an integral portion of a compressor utilized to recover refrigerant vapors and/or liquids. The manifolds as known generally utilize extremely complicated circuitry and normally employ the use of three valves. A need exists to reduce the complication of circuitry used within manifolds and to reduce the complexity, number, and to improve the types of valves utilized within a manifold which is a portion of a device used for the recovery of refrigeration vapor and/or liquids from a refrigeration system.

GENERAL DESCRIPTION OF THE INVENTION

The compressor head, internal and/or external discriminator, and manifold design in general utilize ball valves on the suction and discharge of a cylinder head in the recovery of refrigerant liquid and/or gasses. The device facilitates the flashing of liquid refrigerant pumped to the compressor which, in turn, assists to cool the compressor head. The flashing of liquid refrigerant to vapor also deters liquid transfer into the compressor enhancing performance thereof. The vapor passages within the discriminator, cylinder head and/or manifold are sized for receipt of spring actuated ball's to open and/or close the vapor passages during suction and/or discharge of refrigerant vapor or liquid by the compressor.

A principal advantage of the present invention is the provision of a compressor formed of relatively simple and inexpensive design and construction which fulfills the intended purpose of recovering refrigerant vapor and/or liquid without risk of damage to refrigeration equipment and/or injury to individuals.

Another principal advantage of the present invention is the provision of a discriminator formed of relatively simple and inexpensive design, construction, and operation which fulfills the intended purpose of recovering refrigeration vapor and/or liquid without risk of damage to refrigeration equipment and/or injury to individuals.

Still another principal advantage of the present invention is the provision of a compressor head formed of relatively simple and inexpensive design, construction, and operation which fulfills the intended purpose of recovering refrigeration vapor and/or liquid without risk of damage to refrigeration equipment and/or injury to individuals.

Still another principal advantage of the present invention is the provision of a manifold formed of relatively simple and inexpensive design, construction, and operation which fulfills the intended purpose of recovering refrigeration vapor and/or liquid without risk of damage to refrigeration equipment and/or injury to individuals.

Still another principal advantage of the present invention is to prevent a valve from being drawn into the suction chamber of a compressor when exposed to liquid to prevent crushing of the valve against the cylinder head and damage to the compressor.

Still another principal advantage of the present invention is to provide at least one, and preferably two, ball valves within the cylinder head for communication with the suction chamber and discharge chamber of the compressor.

Still another principal advantage of the present invention is the provision of a discriminator which flashes liquid refrigerant to vapor during the recovery of refrigerant for minimization and/or elimination of refrigeration liquid entry into the compressor.

Still another principal advantage of the present invention is the provision of a discriminator which flashes liquid refrigerant to vapor reducing the temperature of the cylinder head during operation of the compressor.

Still another principal advantage of the present invention is the provision of a ball valve in the suction chamber is a cylinder head which enables the discharge valve to be fully open, while preventing the suction valve from being drawn into the compressor.

Still another principal advantage of the present invention is the provision of a compressor head which does not heat incoming vapor by exposing the incoming vapor to vapor to be discharged, which in turn, reduces the heat of the compressor.

Still another principal advantage of the present invention is the provision of a compressor head which eliminates stress points of known valves, such as poppet valves, thereby extending the useful life of the valves and the compressor head.

Still another principal advantage of the present invention is the provision of a compressor head which is flexible and which may be easily and efficiently maintained by convenient replacement of balls functioning within the intake and discharge valves eliminating the necessity of replacement and discard of an entire compressor head.

Still another principal advantage of the present invention is the provision of a discriminator which automatically and mechanically distinguishes recovered refrigeration liquid from gas or vapor permitting the compressor to safely function.

Still another principal advantage of the present invention is the provision of a discriminator which minimizes the volume of flow of liquid enabling the flashing of the liquid to a vapor during refrigerant recovery efforts.

Still another principal advantage of the present invention is the provision of a discriminator which includes a ball valve where the ball of the ball valve is buoyant with respect to liquid refrigerant.

Still another principal advantage of the present invention is the provision of a discriminator which includes a ball valve where the ball drops and does not float when recovered refrigerant is in the vapor phase.

Still another principal advantage of the present invention is the provision of a discriminator which includes a ball valve which assists in metering the volume of liquid refrigerant to be exposed to the compressor during refrigerant recovery procedures.

Still another principal advantage of the present invention is the provision of a discriminator which includes a ball valve which, in turn, floats when exposed to liquid refrigerant shutting off the intake and/or inlet passage of the compressor during refrigerant recovery efforts.

Still another principal advantage of the present invention is the provision of a discriminator which includes a ball valve where the ball includes rivulets permitting a minimum volume of a refrigerant liquid to bypass the valve for flashing into vapor and for passage to the compressor during use of the refrigerant recovery apparatus.

Still another principal advantage of the present invention is the provision of a discriminator which includes a ball valve where minimal amounts of liquid refrigerant are forced around the ball, bypassing the valve, where the liquid is exposed to negative pressure on the opposite side of the ball valve causing the flashing of the liquid refrigerant into vapor while simultaneously cooling the compressor head.

Still another principal advantage of the present invention is the provision of a manifold which enables simpler valves to be utilized within the intake and discharge ports.

Still another principal advantage of the present invention is a manifold which redirects flow of recovered refrigerant into desired circuitry so that the recovery and/or purpose of a refrigerant recovery system may be accomplished.

Still another principal advantage of the present invention is the provision of a manifold which assists in the discrimination between recovered liquid and/or vapor refrigerant for control of the flow of the liquid and/or vapor refrigerant to maximize operation and useful life of a compressor.

Still another principal advantage of the present invention is the provision of a manifold which may include a third valve utilized to purge a refrigeration system under maintenance and repair.

Still another principal advantage of the present invention is the provision of a manifold which does require a control device on the suction side enabling continued operation of the compressor during the presence of liquid refrigerant.

Still another principal advantage of the present invention is the provision of a manifold which simplifies the refrigerant recovery circuitry by the presentation of all desired valves, gauges, inlets, and outlet ports proximate to the same phase.

Still another principal advantage of the present invention is the provision of a manifold which permits convenient mounting of safety devices within minimal tubing and fixtures utilized during the refrigerant recovery procedures.

BRIEF DESCRIPTION OF THE SEVERAL VIEWS OF THE DRAWING(S)

FIG. 10 is a cross-sectional side view of a cylinder head taken along the line of 10—10 of FIG. 8;

DETAILED DESCRIPTION OF THE INVENTION

Figure 1:
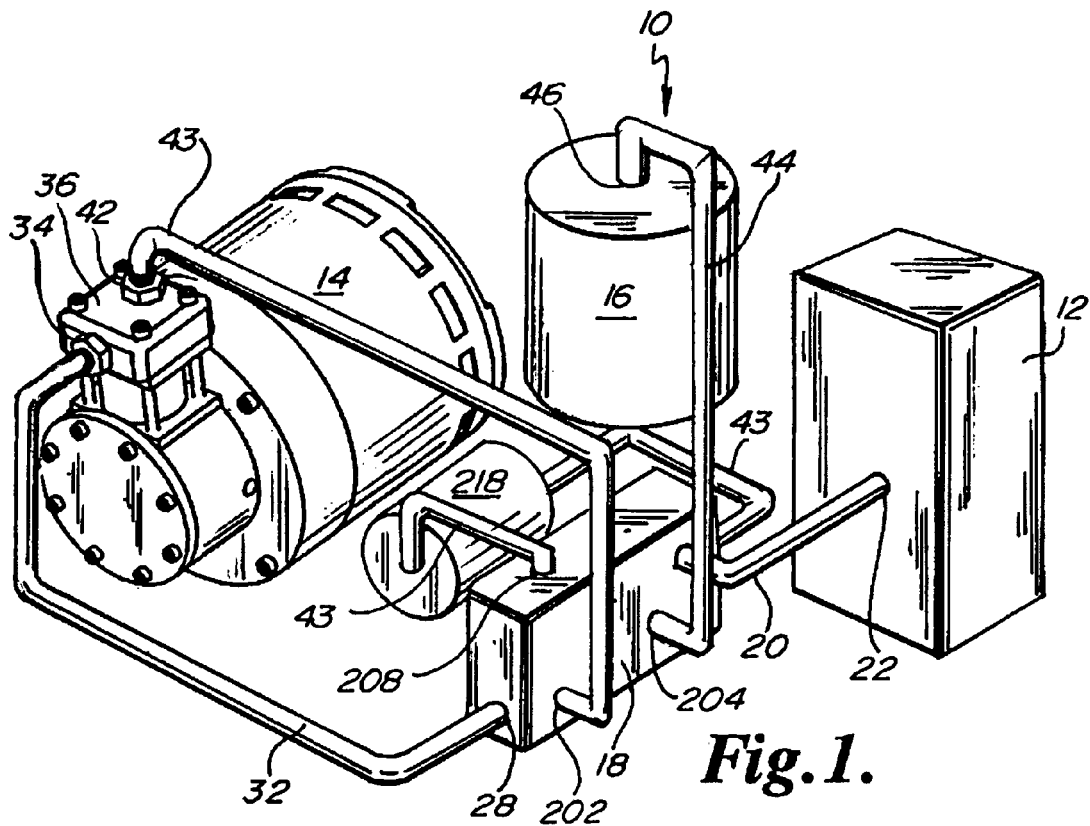
FIG. 1 is an isometric view of the refrigerant recovery system.

In general, the compressor head, internal/external discriminator, manifold refrigerant recovery system is indicated by the numeral 10. The compressor head, internal/external discriminator, manifold refrigerant recovery system 10 initiates with a refrigeration system 12 which is in need of servicing. Frequently, during servicing of a refrigeration system 12, liquid and vapor refrigerant is recovered and is not discarded into the environment.

Conventional compressors 14 may be utilized during the refrigerant recovery process, where the conventional compressors 14 include motors, rotors, and/or stators as known. Generally, the compressor 14 functions to withdraw lubricating and cooling emulsions from a system 12 subject to repair for ultimate transfer into a temporary storage tank 16.

In general, a refrigeration system contains liquid oil which may be used for lubrication and rust prevention for internal parts of the refrigerant circulation system. In general, liquid refrigerant 104 is vaporized in an evaporator which permits the absorption of heat from a surrounding environment. Oil within a refrigeration system may be maintained in a liquid state as a result of a higher evaporation point. Oil and liquid refrigerant may flow together with vapor refrigerant within a closed refrigeration system. The existence of oil/liquid refrigerant within a compressor cylinder may cause severe damage to a piston and/or to the inner wall of the compressor cylinder or valve plate. Further, liquid oil and/or liquid refrigerant may deter the compression of vapor refrigerant thereby decreasing the efficiency of the compressor 14.

Referring to FIG. 1, the refrigeration system subject to servicing 12 is generally in vapor and fluid flow communication with a manifold 18 through the use of a first conduit or hose 20. The refrigeration system 12 may include a first outlet 22 and the manifold 18 may include a first inlet 24. The first outlet 22 and the first inlet 24 may further include fittings to facilitate coupling of the first conduit or hose 20.

In general, the manifold 18 includes vapor and/or liquid circuits which define passages for vapor and/or liquid flow through the manifold 18 to the second outlet 28. A discriminator 30 is preferably positioned in fluid and vapor flow communication with the second outlet 28 of the manifold 18. In an alternative embodiment, the manifold 18 may be replaced with an external discriminator 30 as described herein.

An internal discriminator 30 is preferably positioned to the interior of the manifold 18 proximate to the second outlet 28. The discriminator 30 preferably functions to eliminate the transfer of liquid to a compressor. The discriminator 30 also preferably functions to flash the liquid refrigerant from a liquid phase to a vapor phase prior to introduction into the compressor 14.

A second conduit or hose 32 is preferably in communication with the discriminator 30 providing a vapor passageway to the cylinder head inlet 34. The cylinder head inlet 34 is preferably in vapor passage communication with the cylinder head 36 which in turn includes vapor passages which are in communication with the piston cylinder and piston. The cylinder head 36 preferably includes a first ball valve 38 which is proximate to the cylinder head inlet 34 and a second ball valve 40 which is proximate to the cylinder head outlet 42.

Refrigerant in the vapor phase passes through the compressor 14, cylinder head 36, and cylinder as known where the piston down stroke creates suction for drawing of vapor into the cylinder head 36 and into the cylinder where the piston up stroke discharges refrigerant vapor through the cylinder head outlet 42 into a conduit or hose 43 for return to manifold 18. Vapor refrigerant is then transferred to condenser 218 by a conduit/hose 43. The condenser 218 is connected to the condenser return port 210 of the manifold 18 by another conduit or hose 43. Recovered refrigerant then exits the manifold 18 for passage through a third conduit or hose 44 for transfer into a temporary storage tank 16.

The temporary storage tank 16 may include an inlet valve 46 which may be a one way check valve or any other type of valve for passage of refrigerant into the temporary storage tank 16.

Figure 2:
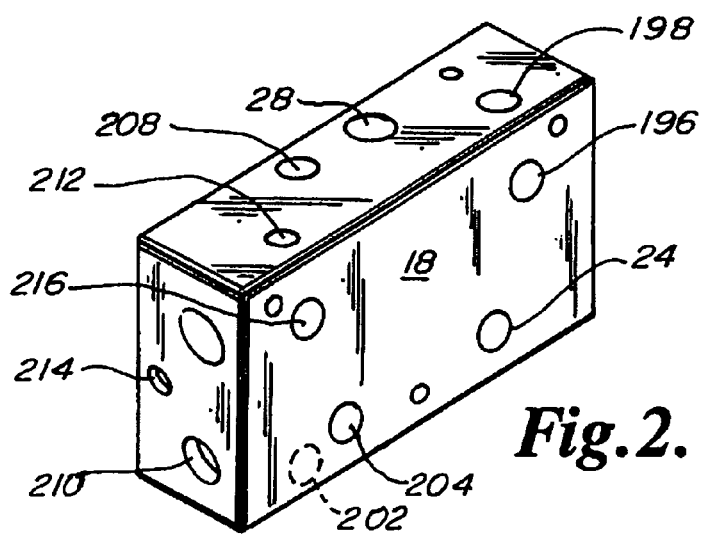
FIG. 2 is a detail isometric view of the manifold.
Figure 11:
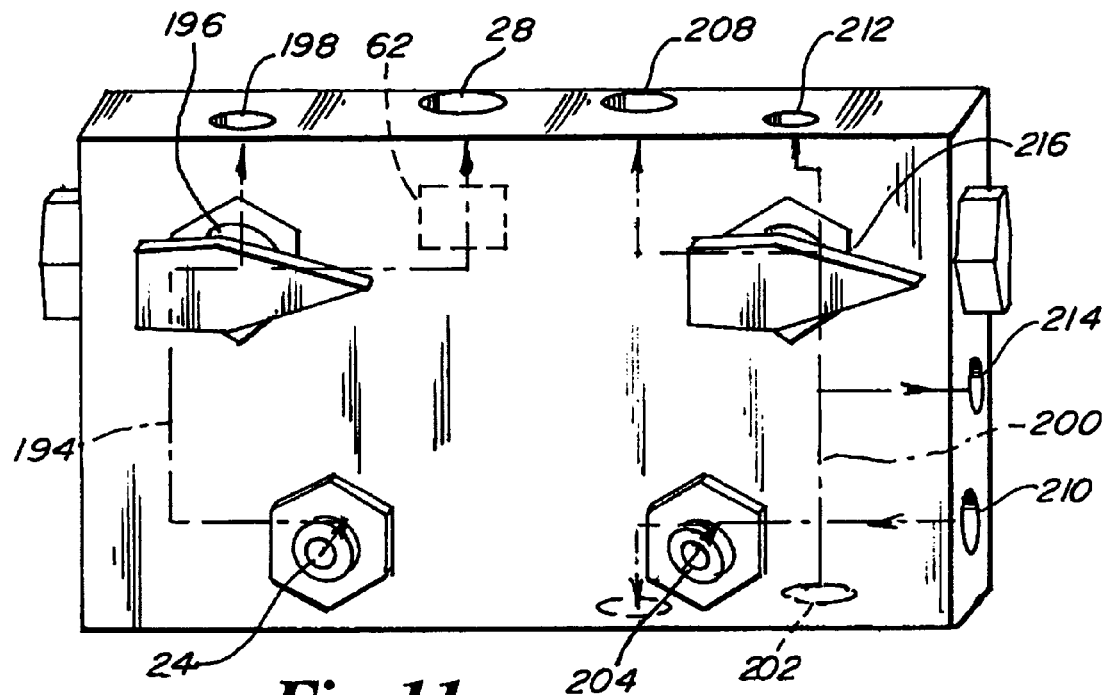
FIG. 11 is a detail view of the manifold.

As may be seen in FIG. 2 and FIG. 11, the manifold 18 is generally rectangular block shaped. Internal to the manifold 18 is the vapor/liquid circuit 194 defining liquid and vapor flow passages which terminate proximate to the second outlet 28. A first fitting 48 may be threadably coupled within the first inlet 24 for releasable affixation to the first conduit or hose 20 as secured to the refrigeration system 12 subject to service. The discriminator 30 may be included internally within the manifold 18 proximate to the second outlet 28. A second fitting 50 may be threadably coupled to the second outlet 28. The second conduit or hose 32 may be releasably coupled to the second fitting 50 to provide a vapor passage to the cylinder head inlet 34.

The manifold 18 preferably functions to separate drawn liquid and/or vapor refrigerant from the refrigeration system 12 as passing to the compressor/cylinder. The manifold 18 further functions to prevent passage of liquid refrigerant to the compressor/cylinder thereby minimizing risk of damage to the compressor 14 during refrigerant recovery efforts.

The first inlet 24 may include a first set of receiving threads 52 which are adapted to receivably engage a second set of penetrating threads 54 of the first fitting 48. The fitting 48 may include a third set of penetrating threads 56 which are adapted for coupling to a receiving set of threads integral to a fitting within a distal end of the first conduit or hose 20.

The second outlet 28 also preferably has a fourth set of receiving threads which are adapted to receivably engage a fifth set of penetrating threads of the second fitting 50.

The manifold 18 includes a cavity 62 which is positioned below and in communication with the second outlet 28. The cavity 62 is the location of the termination of the closed vapor/liquid refrigeration circuit/passages 194 of the manifold 18.

Figure 3:
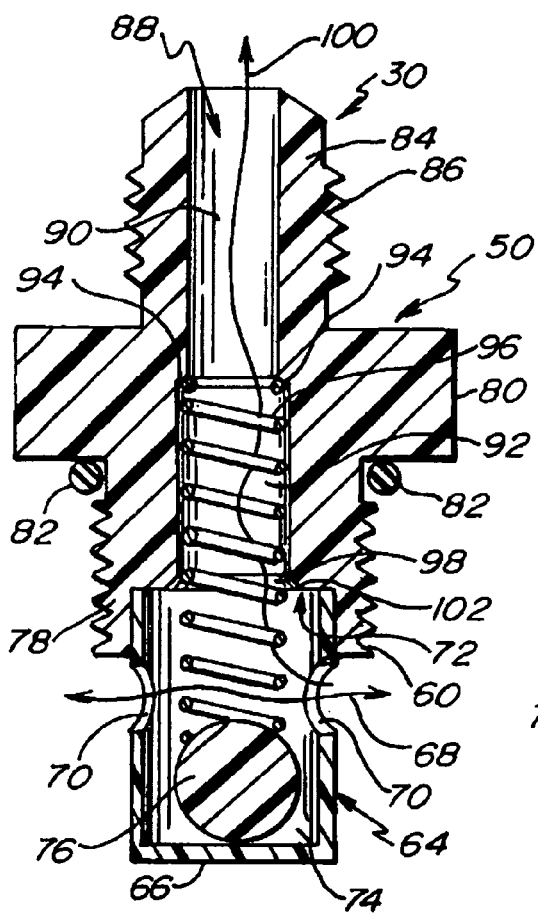
FIG. 3 is a detail cross-sectional side view of the discriminator.
Figure 4:
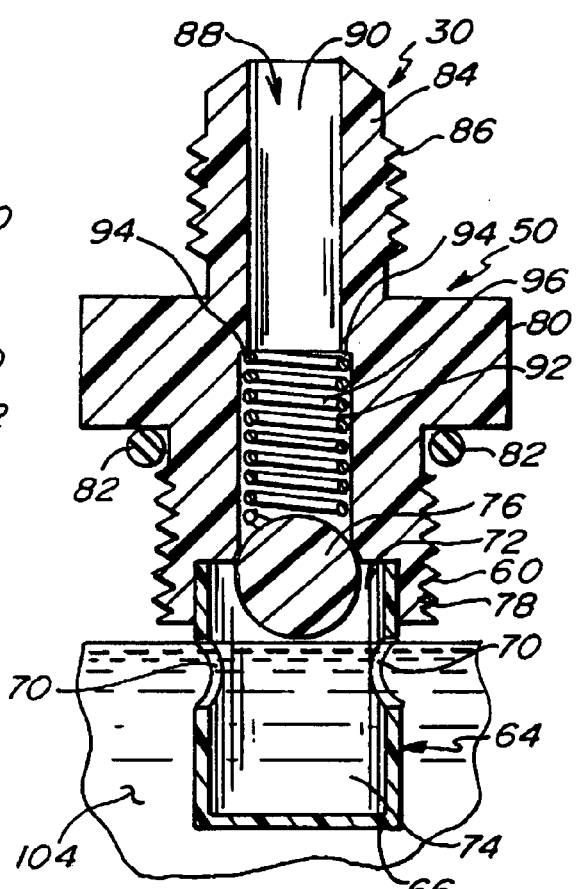
FIG. 4 is an alternative detail cross-sectional side view of the discriminator.

The discriminator 30 is positioned in vapor/fluid flow communication with the vapor/liquid circuit passages 194, cavity 62, and second outlet 28 of the manifold 18. The discriminator 30 includes a retainer 64 which is generally cylindrical shaped having a base 66. The retainer 64 has a lateral passage identified by arrow 68 which is defined by substantially aligned opposing openings 70. The retainer 64 also preferably includes an open top 72. Below the lateral passage 68 is a liquid accumulation region 74. A ball 76 is positioned internal to the retainer 64. (FIGS. 3 and 4.)

The retainer 64 is preferably affixed, secured, and/or integral to the bottom 78 of second fitting 50. The fifth set of penetrating threads 60 are located proximate to the bottom 78 of fitting 50.

Fitting 50 includes a grasping region 80 which is used for tightening relative to manifold 18. Immediately below the grasping region 80 is preferably located an O-ring 82. The O-ring 82 is preferably positioned between the bottom surface of the grasping region 80 and the top surface of the manifold 18 to provide for a sealing engagement between the second fitting 50 and the second outlet 28 of the manifold 18.

The fitting 50 preferably includes an upper section 84 which includes a sixth set of penetrating threads 86.

Within the interior of the second fitting 50 is preferably a vapor passage in general identified by the numeral 88. The vapor passage 88 preferably includes a first region 90 which is positioned proximate to the exit port for the fitting 50. A second region 92 is positioned below the first region 90 and includes opposing spring ledges 94. Generally, the second region 92 is larger in size or diameter than the first region 90. A spring 96 is located within the second region 92. The spring 96 is prohibited from positioning within the first region 90, and exit from the second fitting 50, by engagement to the spring ledges 94. The second region 92 terminates at a first seat 98 which is positioned proximate to the open top 72 of the retainer 64. The spring 96 extends from the opposing spring ledges 94 downwardly through the second region 92 and through the open top 72 of the retainer 64 into the liquid accumulation area 74 for engagement to the ball 76.

The ball 76 is generally spherical and formed of any type of plastic or other material which is buoyant and/or floats and is further inert upon exposure to liquid refrigerant. One example of a material used for the ball 76 is PTFE plastic or an equivalent material thereof.

FIG. 3 shows the relative positioning of the ball 76 as proximate to the base 66 within the interior of the retainer 64. In this position the spring 96 is fully expanded where the compressor 14 is drawing vapor refrigerant through the manifold 18 from the refrigeration system 12 being serviced. Arrow 100 identifies the vapor flow through the lateral passages 68 upwardly past the spring 96, second region 92 and into the first region 90 for exit from the second fitting 50 and into the second conduit/hose 32.

The O-ring 82 functions to provide a vapor seal with the exterior surface of the manifold 18 proximate to the second outlet 28.

The first seat 98 preferably includes an arcuate wall 102 which is adapted for contact with the exterior surface of the ball 76 when the compressor 14 is drawing liquid refrigerant within the liquid accumulation region 74. The positioning of the ball 76 upwardly in contact with the arcuate wall 102 preferably closes access to the second region 92 preventing passage of liquid refrigerant out of the second fitting 50 and manifold 18 during recovery of vapor refrigerant.

FIG. 4 shows the liquid accumulation region 74 holding liquid refrigerant 104. The level of the liquid refrigerant 104 has preferably elevated to the level of the lateral passage 68 of the retainer 64. The closed vapor/liquid circuit 26 of the manifold 18 causes the liquid refrigerant 104 to accumulate within region 74 to elevate ball 76 to compress spring 96 for positioning of ball 76 within the first seat 98 to close vapor passage 88 preventing the suction of liquid refrigerant 104 from the discriminator 30 through the second conduit or hose 32 and into the cylinder head 36. The integrity of the compressor 14 and cylinder head 36 is thereby maintained by the prevention of exposure to liquid refrigerant 104.

The buoyancy of the ball 76 upon the liquid refrigerant 104 is preferably of sufficient strength to compress spring 96 within the second region 92 and against the opposing spring ledges 94. The lowering of the level of liquid refrigerant 104 within the accumulation region 74 permits the spring 96 to expand for lowering of the ball 76 toward the base 66 of the retainer 64. The separation of the ball 76 from the first seat 98 permits vapor refrigerant passage into the second region 92 and out of the first region 90 for transfer to the cylinder head 36 by way of the second conduit or hose 32.

Figure 5:
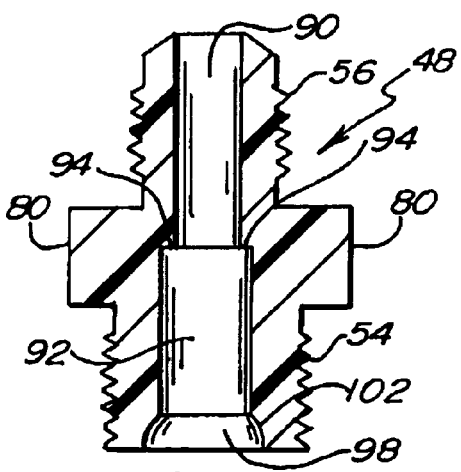
FIG. 5 is a detail cross-sectional side view of a fitting.

FIG. 5 is a detail view of the second fitting 50 showing the arcuate wall 102 of the first seat 98. The arcuate wall 102 is preferably adapted for sealing engagement with the exterior of the ball 76 at such times as the accumulation region 74 is filled with liquid refrigerant 104.

The spring 96 and ball 76 thereby function to restrict the passage of liquid refrigerant 104 through the second fitting 50 during the recovery of refrigerant from a refrigeration system 12.

Figure 6:
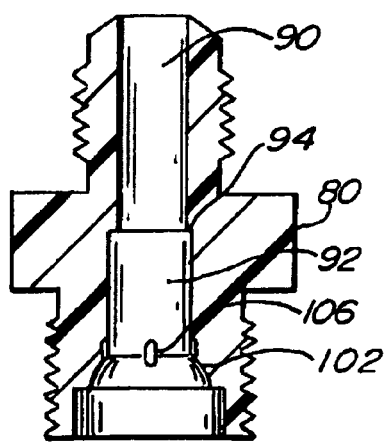
FIG. 6 is an alternative detailed cross-sectional side view of a fitting.

Referring to FIG. 6, the first seat 98 preferably includes a plurality of rivulets/striations 106 which create minute flow passages between the open top 72 of the retainer 64 and the second region 92 of the vapor passage 88. During positioning of the ball 76 within the first seat 98, the rivulets/striations 106 establish minute fluid flow passages into the second region 92 of the vapor passage 88. During positioning of the ball 76 within the first seat 98, high pressure is established within the retainer 64 and low pressure exists within the second region 92 and first region 90 of the vapor passage 88. As the compressor 14 continues to draw vapor, a partial vacuum is created within the first region 90 and second region 92. The creation of minute fluid passages through the rivulets/striations 106 enables a small amount of liquid refrigerant 104 to bypass the ball 76 as positioned within the first seat 98. The passage of liquid refrigerant from a high pressure side within the retainer 64 to the low pressure as existing between the first region 90 and second region 92 causes the liquid refrigerant to expand and to flash to vapor.

Generally, liquid refrigerant 104 is incompressible. In compressing any gas a large amount of heat is generated. Heat is generally detrimental to pistons, cylinder heads 36 and valves and seals within the cylinder head 36. The flashing of liquid refrigerant to vapor instantly cools the cylinder head 36, lowering the overall temperature of the system which extends the life of the compressor 14.

Generally, the rivulets/striations 106 are positioned between the top portion of the first seat 98 and the bottom portion of the second region 92 of the vapor passage 88.

Figure 7:
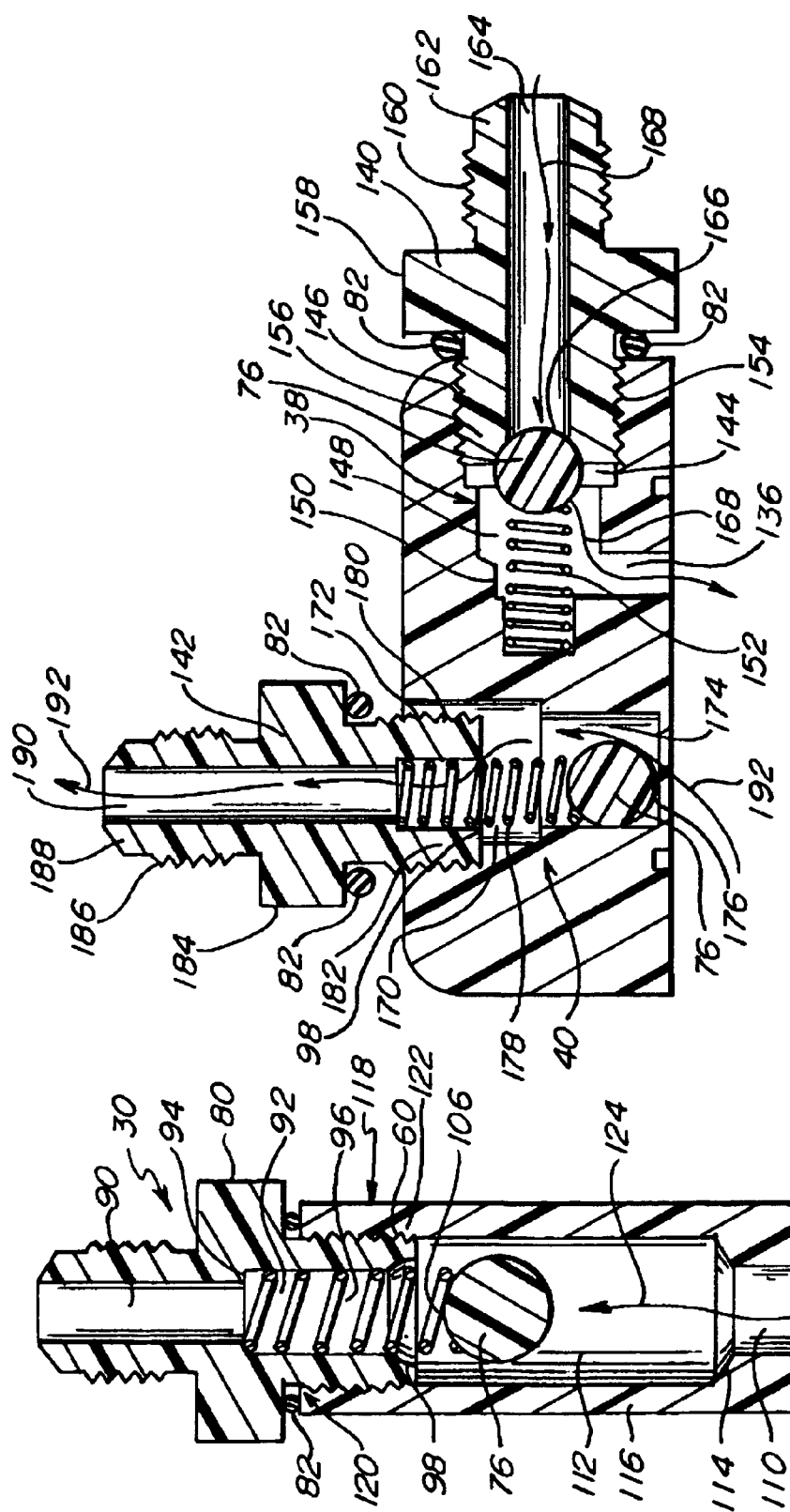
FIG. 7 is an alternative detailed cross-sectional side view of an external discriminator.

An alternative embodiment of the discriminator is depicted in FIG. 7. The discriminator 30 of FIG. 7 is generally referred to as an external discriminator which is substantially tubular in shape. The external discriminator 30 may be secured, attached, and/or connected by the first conduit or hose 20 to a refrigeration system 12 being serviced. The inlet 108 is required to be in sealing vapor and fluid flow communication with the first conduit or hose 20. The external discriminator 30 as depicted in FIG. 7 is generally used in substitution and/or in replacement of the manifold 18.

The inlet 108 may be either externally and/or internally threaded for coupling to the first conduit or hose 20, alternatively, the inlet 108 may be integral to and/or press fit with respect to the first conduit or hose 20.

The first inlet 108 preferably includes a first inlet chamber 110 which is of smaller size and/or diameter than the central chamber 112. A second seat 114 preferably is located between the first inlet chamber 110 and the central chamber 112. The second seat 114 preferably prevents the forcing of the ball 76 downwardly into the first inlet chamber 110 and/or first conduit or hose 20 thereby blocking fluid and/or vapor flow communication from the refrigeration system 12.

The central chamber 112 is generally defined by one or more exterior walls 116. Preferably the exterior wall 116 is cylindrical in shape and is formed of one piece construction. Alternatively, the exterior walls 116 may be formed in any desired configuration provided that the essential functions, features, and attributes described herein are not sacrificed.

The external discriminator preferably includes an upper portion 118 having an open top 120. The interior of the upper portion 118 may include a seventh set of internal receiving threads 122 which are preferably adapted for mating engagement with a fifth set of penetrating threads 60 of second fitting 50.

The features of the second fitting 50 namely the vapor passage 88, first region 90, second region 92, opposing spring ledges 94, spring 96, and/or first seat 98, in addition to the grasping region 80 are preferably identical between the external and internal discriminator 30.

The spring 96 is preferably located within the central chamber 112 of the external discriminator 30 and the central region 92 of the second fitting 50. The spring 96 preferably traverses the first seat 98 and is engaged to the ball 76. The ball 76 within the external discriminator 30 preferably functions as a fluid flow meter/restrictor in an identical manner as described with respect to the internal discriminator 30.

An O-ring 82 is preferably in sealing engagement between the open top 120 and the bottom portion of the grasping region 80 of the second fitting 50.

The spring 96 preferably does not manipulate the ball 76 downwardly to the second seat 114. Therefore, the suction of the compressor to draw vapor elevates the ball 76 from the second seat 114 upwardly to establish a vapor passage indicated in general by arrow 124. Preferably the ball 76 does not have sufficient mass to block the inlet 108 during the suction down stroke of the cylinder within the compressor 14. Preferably the ball 76 is sufficiently light weight to upwardly disengage from the inlet 108 and second seat 114 during suction for engagement to the spring 96. In the event that fluid/liquid refrigerant is drawn into the external discriminator 30, the ball 76 will float as earlier described and compress spring 96 against opposing spring ledges 94 of second region 92 within second fitting 50 as earlier described. At such time as the external discriminator is filled with liquid refrigerant, the ball 76 will elevate to sealing engagement with the first seat 98. A very small amount of fluid will be permitted to pass the ball 76 as positioned within the first seat 98 by way of the rivulets/striations 106 which preferably flash liquid refrigerant to vapor within the second region 92.

The inherent buoyancy of the ball 76 elevates the ball 76 towards the first seat 98 compressing spring 96 during the presence of fluid within the central chamber 112. The ball 76 is positioned within the first seat 98 upon filling of the central chamber 112 with liquid refrigerant. The first seat 98 also includes rivulets/striations 106 as earlier described to permit flashing of liquid refrigerant as passing from the high pressure central chamber 112 to the low pressure second region 92 past the ball 76 and first seat 98 as earlier described.

The external discriminator 30 may be used to replace or as a supplement to the manifold 18 as earlier described. Alternatively, a manifold 18 without an internal discriminator 30 may be used in conjunction with an external discriminator 30 to reduce and preferably eliminate the suction of liquid refrigerant into the compressor 14.

Figure 8:
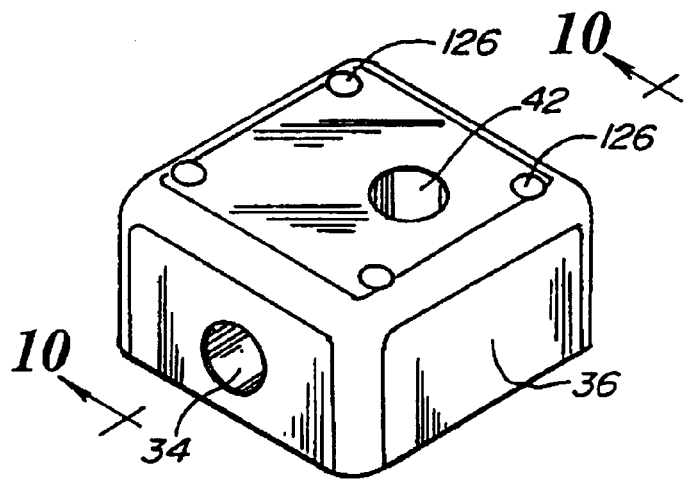
FIG. 8 is an isometric view of a cylinder head.
Figure 9:
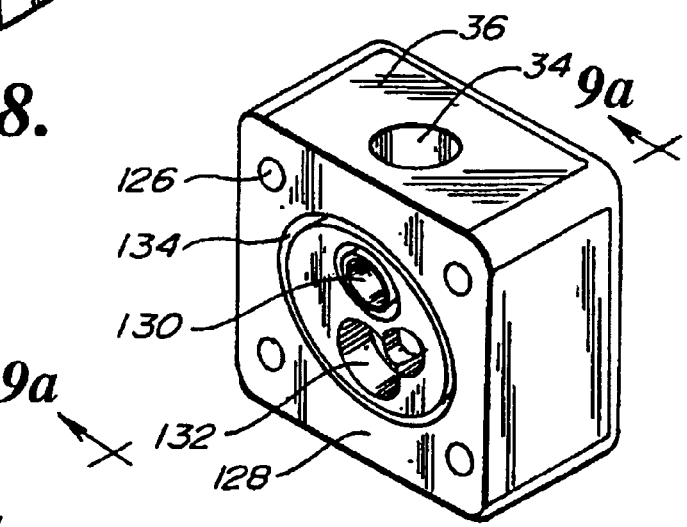
FIG. 9 is an alternative isometric view of a cylinder head.
Figure 9A:
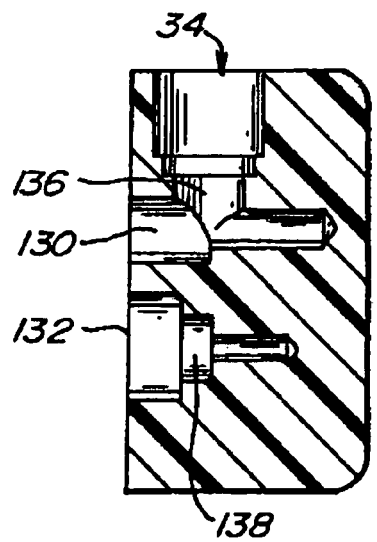
FIG. 9A is a detail cross-sectional side view of a cylinder head taken along the line 9—9 of FIG. 9.

FIGS. 8, 9, and 9A, depict the cylinder head 36. Generally, the cylinder head 36 is substantially rectangular and includes an inlet 34 and an outlet 42. A plurality of affixation apertures 126 traverse the cylinder head 36 and are used to releasably secure the cylinder head 36 to the compressor 14.

The base or bottom 128 of the cylinder head 36 is depicted in FIG. 9. An inlet orifice 130 and an outlet orifice 132 traverse the base 128 of the cylinder head 36 and are in vapor flow, and to a minimum extent, fluid flow relationship with the inlet 34 and the outlet 42 respectively. A gasket 134 as is known in the art is preferably positioned between the cylinder head 36 and the cylinder of the compressor 14.

FIG. 9A depicts, in cross-section, the internal suction passage from the inlet orifice 130 to the inlet 34. The suction passage 136 preferably includes an angle of approximately 90° between the inlet 34 relative to the inlet orifice 130. The discharge passage 138 is substantially aligned between the outlet orifice 132 and the outlet 42.

FIG. 10 depicts in cross-section the cylinder head 36 and the first ball valve 38 and the second ball valve 40. The first ball valve 38 is preferably proximate to the suction inlet 34 and the second ball valve 40 is preferably proximate to the discharge outlet 42. A third fitting 140 is preferably disposed within the inlet 34 and a fourth fitting 142 is preferably disposed within the outlet 42.

In more detail, the suction side of the cylinder head 36 includes a fitting receiving chamber 144 having an eighth set of receiving threads 146. Interior to the fitting receiving chamber 144 is preferably a first transition chamber 148. The suction passage 136 is preferably in vapor/liquid communication with the first transition chamber 148 to permit vapor passage there through. A third seat 150 preferably defines the inner section between the first transition chamber 148 and the suction passage 136. A second spring 152 is positioned in transverse relationship to the suction passage 136 for engagement to the ball 76. The second spring 152 manipulates the ball 76 horizontally toward the fourth seat 166 of the third fitting 140.

The third fitting 140 preferably includes a ninth set of penetrating threads 154 on the exterior surface of the distal end 156, a grasping central region 158, and a tenth set of penetrating threads 160 on the proximate end 162 as adapted to mate with the second conduit/hose 32. A first bore passage 164 is preferably centrally located through the third fitting 140 traversing the proximate and distal ends 156, 162 respectively. The first bore passage 164 includes a fourth seat 166 as positioned between the third fitting 140 and the fitting receiving chamber 144. The fourth seat 166 is preferably adapted to receive the ball 76 to close the first bore passage 164 and the inlet 34 during the up stroke of the cylinder and the discharge of vapor from the outlet 42. During the down stroke of the cylinder, the ball 76 is preferably drawn to compress the second spring 152 toward the interior of the inlet 34 disengaging the ball 76 from the fourth seat 166. A vapor passage identified by arrow 168 through the first bore passage 164, past the ball 76 through the first transition chamber 148, past the second spring 152, through the suction passage 136 and into the cylinder is thereby provided.

In more detail, the discharge side of the cylinder head 36 includes a fitting receiving chamber 170 having an eleventh set of receiving threads 172. Interior to the fitting receiving chamber 170 is a first transition chamber 174. The discharge passage 138 is preferably in vapor/liquid communication with the first transition chamber 174 to permit vapor passage there through. A fifth seat 176 preferably defines the area between the first transition chamber 174 and the discharge passage 138. A third spring 178 is positioned in normal relationship to the discharge passage 138 for engagement to a ball 76. The third spring 178 manipulates the ball 76 vertically toward the first seat 98 of the fourth fitting 142.

The fourth fitting 142 preferably includes a twelfth set of penetrating threads 180 on the exterior surface of the distal end 182, a grasping central region 184, and a thirteenth set of penetrating threads 186 on the proximate end 188. A second bore passage 190 is preferably centrally located through the fourth fitting 142 traversing the proximate and distal ends 188, 182 respectively. The second bore passage 190 includes the first seat 98 as positioned proximate to the distal end 182. The fifth seat 176 is adapted to receive the ball 76 to close the second bore passage 190 at the outlet orifice 132 during the down stroke of the cylinder and the suction of vapor from the inlet 34. During the up stroke of the cylinder, the ball 76 is preferably elevated to compress the third spring 178 toward the exterior and outlet 42, disengaging the ball 76 from the fifth seat 176. A vapor passage depicted by arrow 192 occurs past the fifth seat 176, ball 76, third spring 178, first transition chamber 174, fitting receiving chamber 170, and second bore passage 190 for exit from the outlet 42. The vapor discharge in general is depicted by arrow 192.

Referring to FIG. 11, the manifold 18 is shown in detail. The manifold 18 includes a first inlet or suction port 24 and a second outlet 28 for communication to the compressor 14. A first manifold passage 194 provides vapor/fluid passage from the system 12 through the manifold 18 to the compressor 14. A suction valve 196 may be in communication with the first manifold passage 194 between the first inlet 24 and the second outlet 28. The discriminator 30 may also be in communication with the first manifold passage 194 between the first inlet 24 and the second outlet 28. The first manifold passage 194 may also include a port 198 adapted to receive a low pressure gauge. The low pressure gauge may be in electric communication with an electric cutoff which, in turn, severs power to the compressor 14 at such time as the pressure within the manifold 18 drops below a preset level. Generally, the preset low pressure level is determined in conformance with the environmental protection agency requirements for automatically terminating operations of the refrigerant recovery system 10.

During the refrigerant recovery mode the suction valve 196 is open permitting vapor and/or liquid refrigerant to flow from the first inlet 24 through the discriminator 30 for exit from the second outlet 28 and to the compressor 14. Recovered refrigerant may be exit the compressor 14 for reentry into the manifold 18 at port 202. Port 202 defines the entry into the second manifold passage 200.

The second manifold passage 200 includes a discharge/purge port 204 and a pressure relief port 206 which is preferably in communication with a pressure relief valve. The second manifold passage 200 is also in communication with a condenser access port 208 and a condenser return port 210. The second manifold passage 200 further includes a high pressure gauge port 212 preferably including a high pressure gauge and a high pressure switch port 214 which includes a high pressure switch. The high pressure switch is preferably in electric communication with an electrical cutoff for termination of electrical power to the compressor 14 upon detection of a high pressure condition.

A discharge valve 216 is preferably in communication with a second manifold passage 200. The suction valve 196 and the discharge valve 216 are preferably Parker Valves. The use of the suction valve 196 and discharge valve 216 in conjunction with the manifold 18 preferably eliminate the need for a third valve and/or a control device on the suction side. In addition, suction valve 196 and discharge valve 216 may be located on the same face of the manifold 18. The manifold 18 further includes safety devices and facilitates the use of minimal tubing and fixtures to provide a simplified manifold 18. During the refrigerant recovery mode the vapor refrigerant entering the manifold 18 at port 202 is directed through the opening of discharge valve 216 to the condenser 218. High pressure vapor refrigerant returns to liquid refrigerant 104 in the condenser 218. The recovered refrigerant 104 then enters the manifold 18 at the condenser reentry port 210 for exit through the discharge/purge port 204. The discharge/purge port 204 is in communication with the third conduit/hose 44 for passage and transfer of recovered refrigerant to storage tank 16.

It is well known in the art to measure the thermal conductivity of ambient surrounding air to determine the level of vacuum. Applicant's have invented an improved vacuum sensor which utilizes low cost dual transistor IC's mounted on a circuit board to make the required thermal conductivity measurements. By mounting the transistors on a circuit board, the sensors can be assembled using automated circuit board assembly processes, resulting in a decrease in the cost of manufacturing the improved vacuum sensor.

Figure 12:
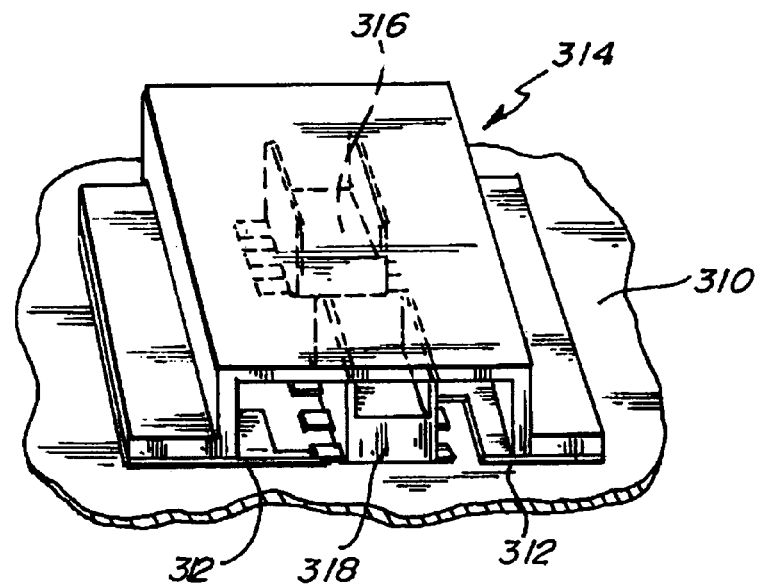
FIG. 12 is a three dimensional view showing the improved vacuum sensor mounted on a circuit board.

FIG. 12 is a three dimensional view showing the improved vacuum sensor mounted on a circuit board.

Figure 13:
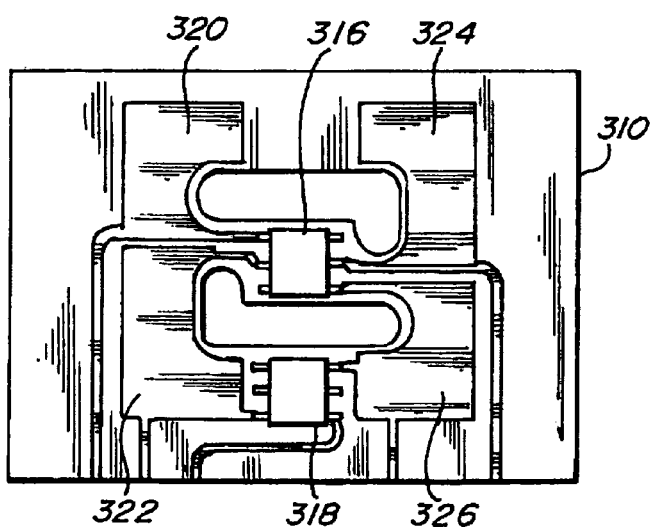
FIG. 13 is a two dimensional schematic showing the improved vacuum sensor mounted on a circuit board.

FIG. 13 is a two dimensional schematic showing the improved vacuum sensor mounted on a circuit board.

Figure 14:
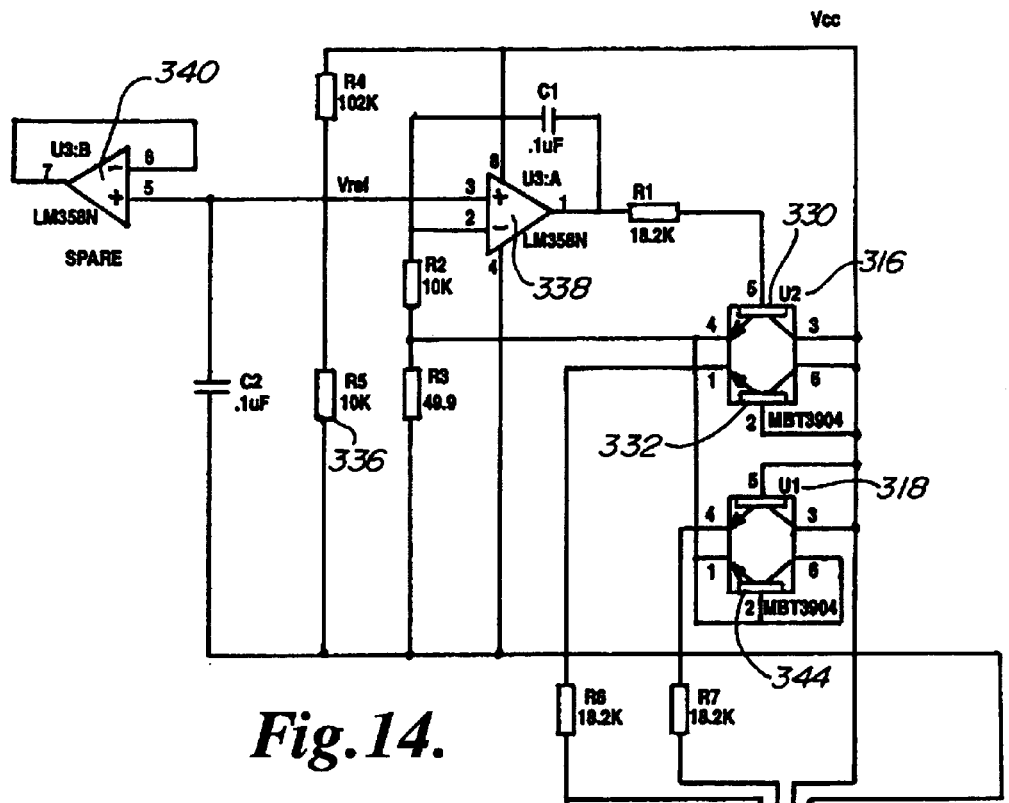
FIG. 14 is a circuit schematic of the improved vacuum sensor.

FIG. 14 is a circuit schematic of the improved vacuum sensor.

Referring now to FIGS. 12 and 13, the circuit board is shown at 310, with a thin layer of electrically insulating thermally conductive material 312 mounted on top of the circuit board 310, and a metal well 314 mounted on top of the electrically insulating thermally conductive material 312. FIG. 12 shows in more detail the two areas 312 of electrically insulating thermally conductive material 312 with the two leg portions of metal well 314 mounted on top of material 312.

A first dual transistor IC (U2), shown at reference numeral 316, is used to generate a fixed amount of heat and to measure the corresponding temperature rise due to that heat. IC 316 is connected by four copper traces to four large copper areas 320, 322, 324 and 326. The copper areas 320, 322, 324 and 326 provide a thermal interface for the metal well 314. IC 316 is placed in metal well 314 and mounted in such a way as to minimize thermal mass and minimize thermal loss through the electrical connections. Thermal mass is minimized by using 0.031" thick circuit board material, by removing circuit board material around the IC's (the white areas in FIG. 13), by using ½ ounce copper foil, and by using 0.008" wide traces to make electrical connections to the IC 316. Thin narrow copper traces are also used to connect IC 316 to copper areas 320, 322, 324 and 326, which also reduce the thermal loss through the electrical connections.

A second dual transistor IC (U1), shown at reference numeral 318, is used to measure the ambient temperature of the metal well 314. The second IC 318 is mounted in such a way as to maximize the thermal conductivity between IC 318 and the metal well 314. Thermal conductivity is maximized by connecting the IC with two very short copper traces to two of the large copper areas 322 and 326 which make thermal contact with the metal well 314. This is done to get the most accurate ambient reading possible.

Each of the dual transistor IC's (316 and 318) used in this embodiment of the inventive vacuum sensor are On Semiconductor's MBT3904DW1T1, which is a dual NPN transistor in a six-leaded SOT-363 surface mount package. Any commercially available dual transistor could be utilized in the inventive vacuum sensor, if desired.

Referring now to FIG. 14, a circuit schematic of an embodiment of the inventive vacuum sensor circuit is shown. IC 316 is comprised of two transistors 330 and 332. Transistor 330 of IC 316 is used to generate heat. A regulated DC supply voltage (Vcc) is provided at the collector (pin 3) of the heating transistor 330. The emitter (pin 4) of the heating transistor 330 is connected to ground 334 through a current sensing resistor (R3) 336.

An operational amplifier circuit is used to maintain a fixed voltage and current at the heater transistor 330. This results in a very efficient constant heat source. The operational amplifier (U3:A) 338 compares the voltage at the sensing resistor (R3) 336 with a reference voltage (Vref), which is pin 5 of operational amplifier (U3:B) 340 and changes the current at the base (pin 5) of the heating transistor 330 in order to keep the sensed current constant. The power dissipated in the heating transistor 330 is then (Vcc−Vref)*(Vref/R3).

The other transistor 332 in this IC 316 is wired as a diode (base and collector connected, pins 2 and 6) and is used to measure the temperature of IC 316. Because the two transistors 330 and 332 are in the same IC 316, the heat transfer between the two transistors 330 and 332 is very good.

IC 318 is used to measure the ambient temperature of the metal well 314 and is comprised of two transistors 342 and 344. Transistor 342 in this IC 318 is wired as a diode (base and collector connected, pins 5 and 3), and used to measure the ambient temperature. The other transistor 344 in this IC 318 is not used in this embodiment.

The sensor board 310 is mounted in contact with the metal well 314 with a thin layer of electrically insulating thermally conductive material 312 between the sensor board 310 and the metal 314.

The external connections to the sensor board consist of a regulated DC voltage (Vcc)(pin 8 of Op Amp 338), a ground return path 334, and a connection to each of the temperature measuring diodes 332 and 342. A fixed current is passed through the two diodes. This fixed current results in a forward voltage at each diode 332 and 342 that changes with temperature. The difference between the two forward voltages (heat sensor and ambient sensor) are compared and converted into a vacuum reading.

While this invention may be embodied in many different forms, there are described in detail herein specific preferred embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below (e.g. claim 3 may be taken as alternatively dependent from claim 2; claim 4 may be taken as alternatively dependent on claim 2, or on claim 3; claim 6 may be taken as alternatively dependent from claim 5; etc.).

This completes the description of the preferred and alternate embodiments of the invention. Those skilled in the art may recognize other equivalents to the specific embodiment described herein which equivalents are intended to be encompassed by the claims attached hereto.

What is claimed is:

1. A discriminator for a refrigerant recovery system for recovery of liquid refrigerant, said discriminator comprising:
   a) a external casing having an internal chamber, said internal chamber having an exit passage;
   b) a ball positioned in said internal chamber, said ball being constructed and arrange for buoyancy with respect to said liquid refrigerant within said internal chamber to at least partially block said exit passage upon exposure to said liquid refrigerant; and
   c) an actuating member positioned in said internal chamber, said actuating member being constructed and arranged to move said ball away from said exit passage upon exposure to liquid refrigerant.

2. The discriminator according to claim 1, said internal chamber comprising a seat wherein said seat is positioned between said internal chamber and said exit passage.

3. The discriminator according to claim 2, wherein said actuating member is positioned at least partially within said exit passage and said actuating member traverses said seat.

4. The discriminator according to claim 3, said discriminator further comprising a retainer comprising a pair of opposite openings defining a lateral passage, said retainer defining said internal chamber.

5. The discriminator according to claim 4, said seat further comprising at least one rivulet, said rivulet being constructed and arranged to pass liquid refrigerant through said seat and around said ball when said ball is positioned in said seat.

6. The discriminator according to clam 5, said actuating member comprising a spring.

7. The discriminator according to claim 6, said ball having a buoyancy level wherein said buoyancy level of said ball exceeds an actuation level exerted by said actuating member upon exposure of liquid refrigerant to said ball.

* * * * *